(12) United States Patent
Butz

(10) Patent No.: US 10,687,923 B2
(45) Date of Patent: Jun. 23, 2020

(54) INTERDENTAL CLEANER AND METHOD FOR MANUFACTURING SAME

(71) Applicant: Sunstar Suisse S.A., Etoy (CH)

(72) Inventor: Jürgen Butz, Schönau (DE)

(73) Assignee: SUNSTAR SUISSE S.A., Etoy (CH)

( * ) Notice: Subject to any disclaimer, the term of this patent is extended or adjusted under 35 U.S.C. 154(b) by 671 days.

(21) Appl. No.: 15/501,310

(22) PCT Filed: Jul. 10, 2015

(86) PCT No.: PCT/EP2015/001415
§ 371 (c)(1),
(2) Date: Feb. 2, 2017

(87) PCT Pub. No.: WO2016/020029
PCT Pub. Date: Feb. 11, 2016

(65) Prior Publication Data
US 2017/0216002 A1   Aug. 3, 2017

(30) Foreign Application Priority Data

Aug. 6, 2014   (DE) .......................... 10 2014 011 405

(51) Int. Cl.
*A61C 15/02*   (2006.01)
*A46B 9/00*   (2006.01)
(Continued)

(52) U.S. Cl.
CPC ............... *A61C 15/02* (2013.01); *A46B 1/00* (2013.01); *A46B 3/005* (2013.01); *A46B 3/04* (2013.01);
(Continued)

(58) Field of Classification Search
CPC . A61C 15/046; A61C 15/02; A46B 2200/108; A46B 15/0069
(Continued)

(56) References Cited

U.S. PATENT DOCUMENTS 337,893 A * 3/1886 Fine et al. ............. B65D 85/24
  206/380
1,470,710 A * 10/1923 Davis ..................... A46B 9/005
  15/167.1
(Continued)

FOREIGN PATENT DOCUMENTS

EP  0 932 371 B1  12/2001
JP  2003 245287 A  9/2003
(Continued)

*Primary Examiner* — Tatiana L Nobrega
(74) *Attorney, Agent, or Firm* — McGlew and Tuttle, P.C.

(57) ABSTRACT

An interdental cleaner has a rod-shaped carrier consisting of plastic, which has a cleaning device in an axial end area. The cleaning device comprises at least one fabric part, which extends in the direction of a longitudinal axis of the carrier and which has mutually intersecting thread systems with warp threads and weft threads. Provisions are made for the fabric part to be connected to the carrier and to radially project from same, wherein thread systems or the warp threads, on the one hand, and the weft threads, on the other hand, extend at an angle in the range of 20° to 70° to the longitudinal axis of the rod-shaped carrier and pass through the rod-shaped carrier.

19 Claims, 12 Drawing Sheets

(51) Int. Cl.
  *A46B 1/00*   (2006.01)
  *A46B 3/00*   (2006.01)
  *A46B 3/04*   (2006.01)
  *A46D 3/00*   (2006.01)

(52) U.S. Cl.
  CPC .............. *A46B 9/005* (2013.01); *A46D 3/005* (2013.01); *A46B 2200/108* (2013.01)

(58) Field of Classification Search
  USPC .................................................. 132/321, 329
  See application file for complete search history.

(56) References Cited

U.S. PATENT DOCUMENTS

| | | | | |
|---|---|---|---|---|
| 3,337,893 A | * | 8/1967 | Fine | A46B 15/00 15/111 |
| 4,998,978 A | * | 3/1991 | Varum | A61C 15/00 132/321 |
| 5,044,041 A | * | 9/1991 | Ljungberg | A46B 3/04 132/321 |
| 5,775,346 A | * | 7/1998 | Szyszkowski | A61C 15/00 132/321 |
| 6,085,761 A | * | 7/2000 | Inaba | A61C 15/02 132/329 |
| 9,968,426 B2 | * | 5/2018 | Butz | A61C 15/00 |
| 2009/0230756 A1 | | 9/2009 | Crossman | |
| 2013/0174866 A1 | * | 7/2013 | Slack | A61C 15/041 132/325 |
| 2014/0008837 A1 | * | 1/2014 | Eatherton | A46B 1/00 264/243 |

FOREIGN PATENT DOCUMENTS

WO   2014/023395 A1   2/2014
WO   2014/023424 A1   2/2014

* cited by examiner

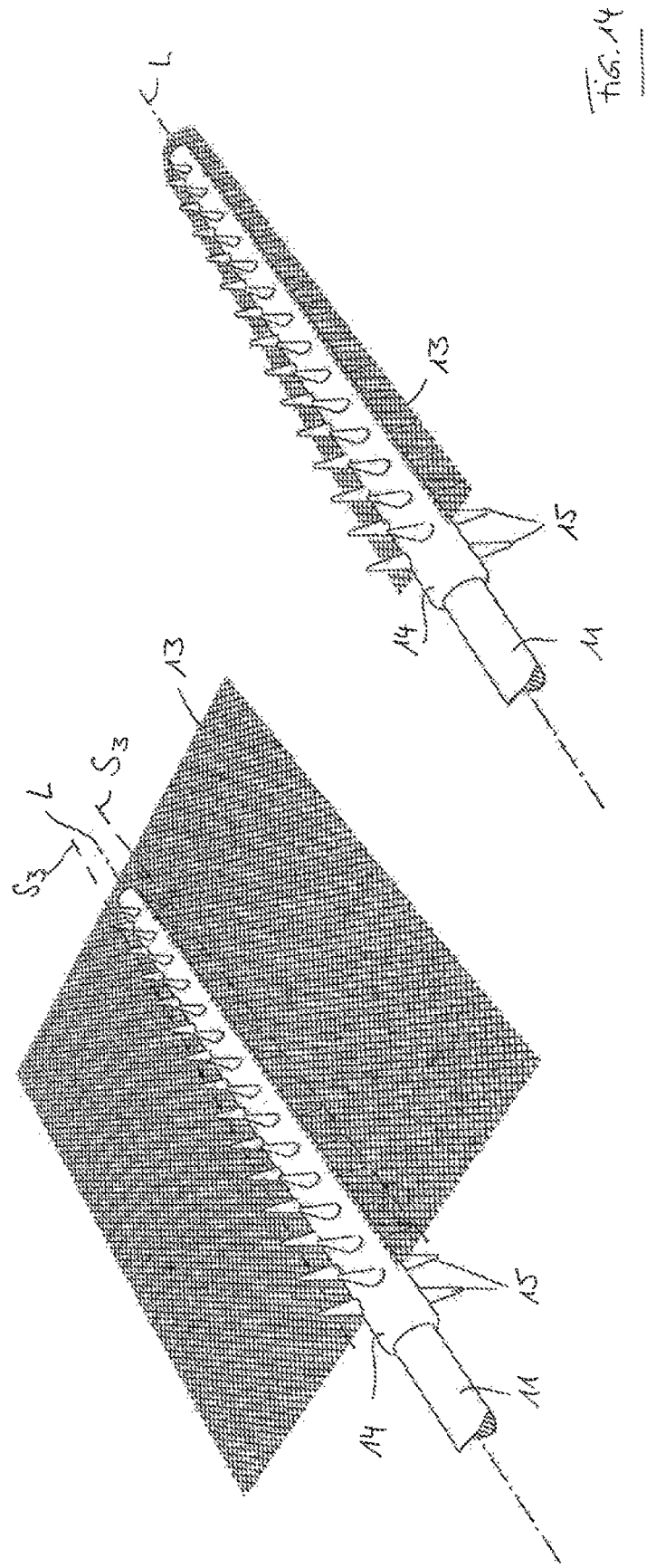

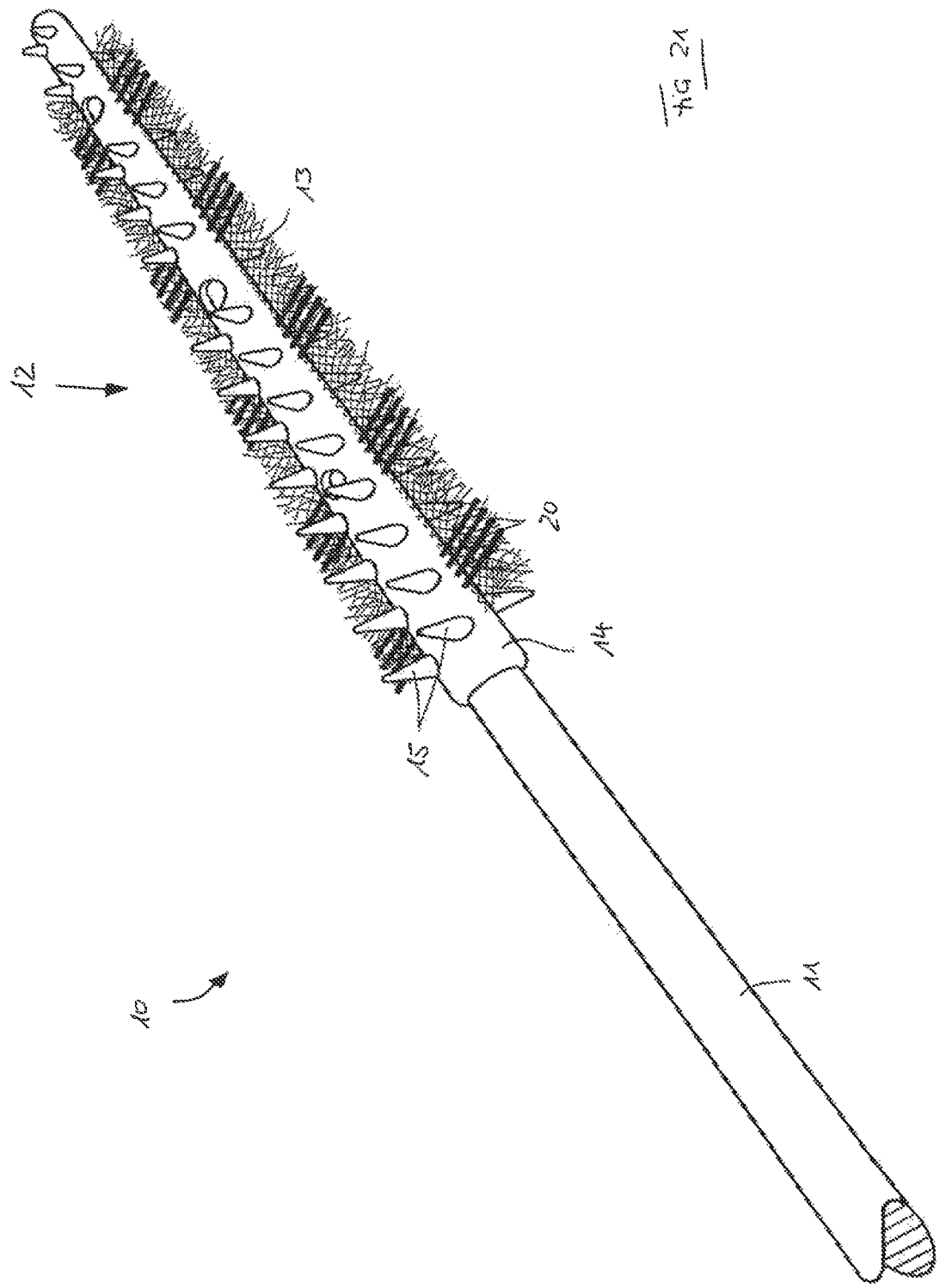

INTERDENTAL CLEANER AND METHOD FOR MANUFACTURING SAME

CROSS REFERENCE TO RELATED APPLICATIONS

This application is a United States National Phase Application of International Application PCT/EP2015/001415 filed Jul. 10, 2015, and claims the benefit of priority under 35 U.S.C. §119 of German Application 10 2014 011 405.8 filed Aug. 6, 2014, the entire contents of which are incorporated herein by reference.

FIELD OF THE INVENTION

The present invention pertains to an interdental cleaner with a rod-shaped carrier consisting of plastic, which has a cleaning device in an axial end area, wherein the cleaning device comprises at least one fabric part extending in the direction of a longitudinal axis of the carrier, which fabric part has mutually intersecting thread systems with warp threads and weft threads, wherein the fabric part is connected to the carrier and projects from same radially. The present invention further pertains to a method for manufacturing a corresponding interdental cleaner.

BACKGROUND OF THE INVENTION

In addition to interdental cleaners consisting of wood or metal wire from earlier times, interdental cleaners consisting of plastic are nowadays known, as they are shown and described in EP 0 932 371. Such an interdental cleaner has a rod-shaped carrier consisting of a relatively hard and dimensionally stable plastic, which is provided in the front area of its axial length with a sleeve-like cover consisting of a soft plastic, for example, a thermoplastic elastomer. On its radially outer side, the cover may have a structuring in the form of nubs and/or radially outwardly extending fingers in order to enhance the cleaning effect.

The user can grasp the interdental cleaner on a grip section of the rod-shaped carrier and insert the rod-shaped carrier with the cover carrying the structuring into an interdental space and move it there to and fro, as a result of which the interdental space is cleaned and particles that may possibly adhere there are detached.

Based on the radially projecting fingers forming the structuring, the cleaning effect of the interdental cleaner is determined essentially by the fingers, which come into contact with the interdental spaces to be cleaned over a relatively small surface, so that a plurality of small-surface, local cleaning zones are obtained, but no large-surface cleaning is achieved. To achieve large-surface cleaning, attempts are made in an interdental cleaner according to U.S. Pat. No. 5,044,041 to apply a flat, net-like fabric part on a rod-shaped carrier by thermal bonding. The fabric part is formed from two thread systems intersecting one another at right angles, so-called warp threads and weft threads, which thread system is inserted into an injection mold and on which the rod-shaped carrier is formed by injection molding. It was found in practice that when the interdental cleaner is used, there is a risk that individual threads become detached from the fabric part in the user's mouth, which is very unpleasant for the user and thus there is a risk that the user will swallow the detached threads.

SUMMARY OF THE INVENTION

The basic object of the present invention is to provide an interdental cleaner with a fabric part, in which the risk of detachment of threads is substantially reduced. Further, a method shall be provided, with which a corresponding interdental cleaner can be manufactured in a simple manner.

This object is accomplished according to the present invention with an interdental cleaner with a rod-shaped carrier formed of plastic, which has a cleaning device in an axial end area, wherein the cleaning device comprises at least one fabric part extending in the direction of a longitudinal axis of the carrier, which fabric part has mutually intersecting thread systems with warp threads and weft threads. The fabric part is connected to the carrier and radially projects from same. Provisions are made for the thread systems, i.e., the warp threads, on the one hand, and the weft threads, on the other hand, to extend at an angle in the range of 20° to 70° and preferably at an angle of 40°±10° to the longitudinal axis of the rod-shaped carrier and to pass through the rod-shaped carrier. Since the thread systems pass through the rod-shaped carrier in the interdental cleaner according to the present invention and are bonded to same not only superficially, the threads forming the thread system are held securely on the carrier, so that they cannot become detached from this during the use of the interdental cleaner. Based on the arrangement of the thread systems and of the threads forming the thread systems at an angle and hence obliquely to the longitudinal axis of the rod-shaped carrier, it is achieved that approximately all threads of the thread systems pass through the carrier and are held in this. Threads extending parallel to the longitudinal axis of the carrier do not occur in the interdental cleaner according to the present invention, because they have a very strong tendency to becoming detached.

Fabrics in the sense of the present invention are all, especially textile flat objects consisting of at least two mutually intersecting thread systems, which are usually called warp threads and weft threads. The warp threads and weft threads may extend, for example, at right angles to one another and be connected to one another and/or woven with one another. If the individual threads of a thread system have a relatively great mutual distance from one another, the fabric forms a network structure, which shall likewise be covered according to the present invention.

The term "axial" used in this text pertains to the longitudinal axis of the rod-shaped carrier and optionally also to the longitudinal axis of a cover. The term "radial" correspondingly pertains to a direction extending at right angles to the axial longitudinal direction.

Provisions are made in a preferred embodiment of the present invention for the fabric part to pass radially and preferably centrally through the carrier and to project from same on opposite sides.

The fabric part may end at a distance from the front axial end of the rod-shaped carrier or extend exactly up to the front end. An enhanced cleaning effect can be achieved if provisions are made, in a variant of the present invention, for the fabric part to project axially over the rod-shaped carrier at the front end thereof.

In addition to the fabric part, the cleaning device may comprise a cover of the carrier, consisting of a soft elastic plastic, on the outer side of which a structuring is formed. The structuring may be, in the known manner, a plurality of fingers and or lips, which project from the cover with a radial component and which consist of the same material as the cover and are connected to same in one piece.

The fabric part may also pass through the cover, in addition to passing through the carrier.

Provisions may be made in a variant of the present invention for the fabric part to project radially over the fingers, i.e., to have a greater free radial protruding length than the fingers. It is ensured in this manner that the fabric part comes into contact with the surfaces to be cleaned and is not shielded by the fingers when it is inserted into an interdental space.

Provisions are made in a possible embodiment of the present invention for the interdental cleaner to have a single fabric part, which preferably projects radially from the carrier on two opposite sides. However, it is also possible to provide a plurality of fabric parts, which preferably extend parallel to one another and are especially located one on top of another. The fabric parts may all have the same basic configuration, but provisions are preferably made for the fabric parts to have different structures and/or different thicknesses and/or different mesh sizes. By selecting suitable fabric parts, interdental cleaners with different functionalities and cleaning effects can thus be manufactured in a simple manner.

In a variant of the present invention, the cleaning device may additionally have a set of bristles comprising a plurality of bristle bundles and/or individual bristles projecting from the carrier with a radial component. Bristles are defined in the sense of the present invention as thin, prefabricated sections of a monofilament or multifilament consisting of plastic, the bristles having a maximum diameter of 0.25 mm and being able to be used as individual bristles and/or as bristle bundles. The bristles are embedded in the carrier and/or the cover and are held securely as a result.

Different cleaning properties are combined in a single interdental cleaner if the cleaning device also has both a soft elastic cover with fingers and/or flaps or lips and radially extending bristles or bristle bundles in addition to the fabric part, as a result of which highly effective cleaning of the interdental spaces is possible.

Provisions are made in a variant of the present invention for the sections of the fabric part radially projecting from the carrier to be spliced in at least some sections, as a result of which a fine splitting of the fabric structure is achieved and the fabric structure is eliminated in this area and a plurality of radially projecting, irregular individual threads are formed.

A change and adaptation of the cleaning properties can be achieved by the splicing of the projecting sections of the fabric part.

With respect to the method for manufacturing an interdental cleaner. At least one fabric part, which has mutually intersecting thread systems with warp threads and weft threads, is extrusion-coated with plastic in an injection mold, while forming a rod-shaped carrier, such that the fabric part passes through the rod-shaped carrier and radially projects from same, the thread systems, i.e., the warp threads, on the one hand, and the weft threads, on the other hand, being arranged at an angle of 20° to 70° and especially at an angle of 45°±10° to the longitudinal axis of the rod-shaped carrier.

The fabric part is preferably arranged such that it preferably passes centrally through the carrier and projects from same on opposite sides.

Provisions are made in a variant of the present invention for the fabric part to be arranged such that it axially projects over the rod-shaped carrier at the front end thereof.

The injection mold has, in the usual configuration, at least two mold halves, which can be adjusted relative to one another, so that the injection mold can be opened and closed. The fabric part is arranged between the mold halves before the injection mold is closed. Provisions may be made in this connection for the fabric part to be arranged in a recess formed in at least one of the mold halves of the injection mold. The fabric part is preferably arranged in the recess with a close fit, so that it is secured against lateral displacement in its surface plane.

Provisions may be made for forming a corresponding recess in the surface facing the other mold half in only one mold half of the injection mold. It is, however, also possible as an alternative that a corresponding recess is formed in both mold halves on the surfaces facing one another and that the fabric part lies in both recesses with the injection mold closed.

The advantage of arranging the fabric in one recess or even in two recesses is especially that the closing force of the injection mold does not cause the fabric to be crushed by the mold halves and it is possible, on the other hand, that the mold halves will close relatively tightly with one another with the injection mold closed.

If the depth of the recess or the sum of the depths of the recesses at right angles to the surface plane of the fabric part is greater than the thickness of the fabric part, the fabric part is not subject to a compressive force by the mold halves when the injection mold is closed and remains undeformed.

Provisions may, however, be made in a preferred embodiment of the present invention for the fabric part to be held under elastic deformation and hence under a prestress at right angles to the surface plane when the injection mold is closed. This can be achieved, for example, by the depth of the recess or the sum of the depths of the recesses being smaller than the corresponding thickness of the fabric part, so that the mold halves clamp the fabric part between them and hold them under prestress when the injection mold is closed.

The dimensions of the recess or recesses are preferably selected to be such that the depth of the recess or the sum of the depths of the recesses corresponds to 70% to 90% of the thickness of the fabric and especially to 75% to 85% of the thickness of the fabric.

Provisions may be made in a variant for the rod-shaped carrier to be provided with a cover of a soft elastic plastic, wherein a structuring is formed on the outer side of the cover. The structuring may be formed in the above-mentioned manner by fingers and/or lips made integrally in one piece. The fabric part is preferably arranged now such that it also passes preferably centrally through the cover.

Moreover, the rod-shaped carrier may be provided with a plurality of bristle bundles and/or individuals bristles projecting from the carrier with a radial component. The bristle bundles and/or individual bristles may be arranged such that they pass radially through the carrier and project from same on opposite sides.

Provisions may be made in a preferred embodiment of the method for the carrier to be twisted about its longitudinal axis at least in a part of its section having the fabric part. If the carrier is provided with the cover, the latter is likewise twisted in at least some sections. Based on the twisting of the carrier and optionally of the cover, the radially projecting sections of the fabric part and optionally the fingers of the cover are distributed over the circumference of the interdental cleaner and, moreover, the rigidity of the interdental cleaner is changed by the twisting or the permanent torsional deformation of the interdental cleaner, which is associated therewith, and can be set in the desired manner by the extent of the twisting.

The sections of the fabric part projecting from the carrier or from the cover can preserve their fabric or net structure, as a result of which they have high stability. Provisions may, however, also be made for the sections of the fabric part projecting radially from the carrier to be spliced, i.e., finely split, in at least some sections, so that the sections of the fabric part projecting radially from the carrier have an irregular structure of fine threads. The splicing is preferably achieved by the corresponding sections of the fabric part being cut with a knife, a rake or a striking tool.

Further details of the present invention appear from the following description of exemplary embodiments with reference to the drawings.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 13 is an interdental cleaner manufactured in the injection mold according to FIG. 11 before trimming the fabric part;

FIG. 14 is the interdental cleaner according to FIG. 13 after trimming the fabric part;

FIG. 21 is the front end of an interdental cleaner according to another embodiment.

DESCRIPTION OF THE PREFERRED EMBODIMENTS

Figure 1:
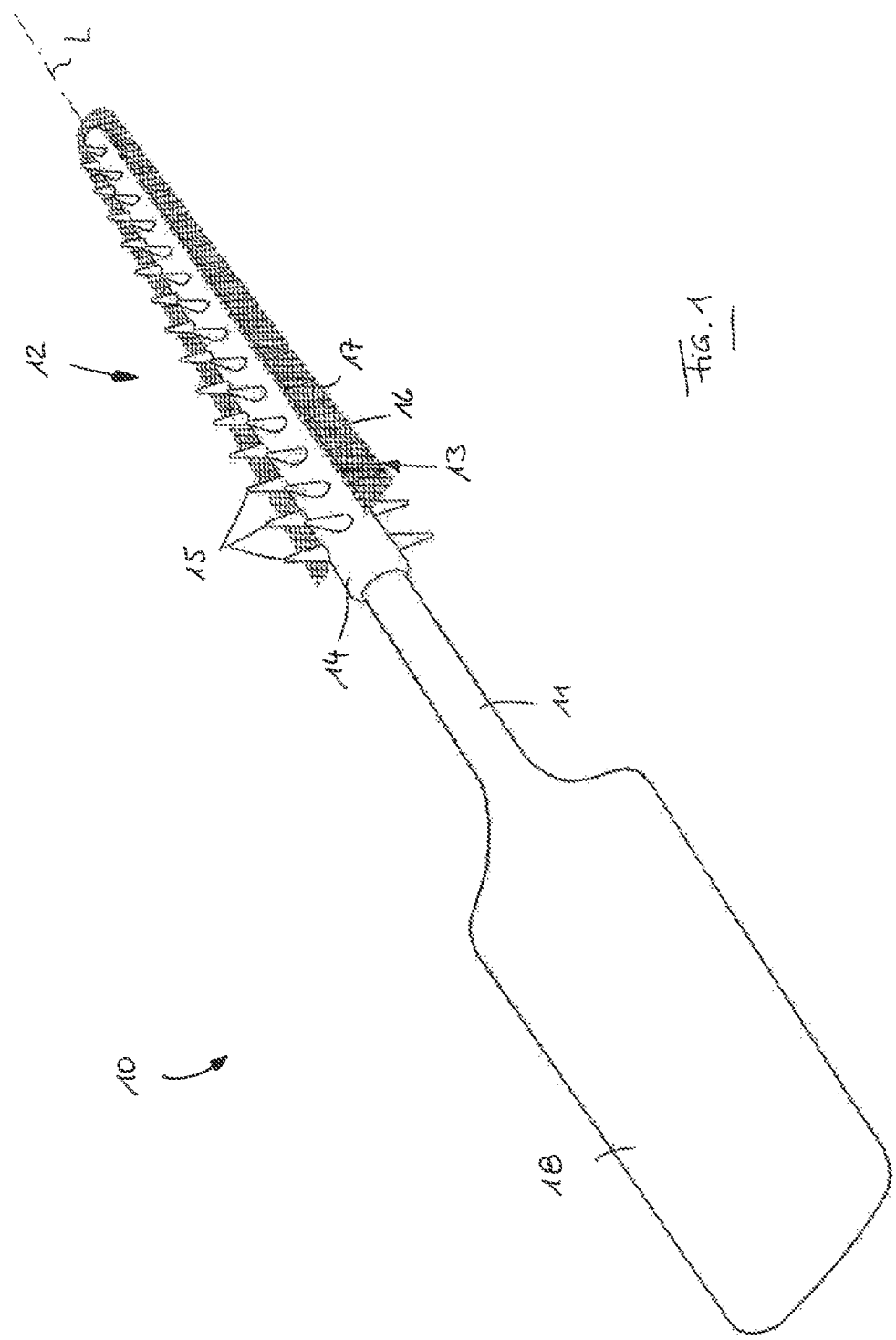
FIG. 1 is a perspective view of an interdental cleaner according to the present invention.

Referring to the drawings, FIG. 1 shows a perspective view of an interdental cleaner 10 according to the present invention, which has a rod-shaped carrier 11. The carrier 11 has an axial longitudinal axis L and preferably consists of a hard or dimensionally stable first plastic material. The carrier 11 has a cleaning device 12 in its end area that is the right-hand end area in FIG. 1 and a grip part 18, by which a user can grip the interdental cleaner 10, at its opposite end, which is the left-hand end according to FIG. 1.

The cleaning device 12 comprises a sleeve-like cover 14, consisting of a soft second plastic material, especially a thermoplastic elastomer, said cover 14 carrying on its outer side radially outwardly projecting fingers 15 made in one piece. Furthermore, a fabric part 13 is embedded in the carrier 11 and the cover 14, said fabric part being located in a longitudinal central axis of the carrier 11 and of the cover 14 in the exemplary embodiment shown, passing through these two components and projecting radially outwardly on opposite sides. Two wing-like attachments, which are arranged on opposite sides, extend in the axial longitudinal direction of the interdental cleaner 10 and are formed by the fabric part 13, are formed in this manner. The fabric part 13 projects over the carrier 11 and the cover 14 at the front axial end of the interdental cleaner 10, which is the right-hand end according to FIG. 1.

The fabric part 13 is a flat object with a net-like structure, which is formed from mutually crossing thread systems. A first thread system is formed by a plurality of warp threads arranged at spaced locations from one another and parallel next to one another, while a second thread system is formed by a plurality of weft threads 17 arranged at spaced locations next to one another, which extend approximately at right angles to the warp threads 16. The warp threads 16 and the weft threads 17 may be connected and/or woven to one another at their intersection points.

FIG. 1 shows that both the warp threads 16 and the weft threads 17 extend at an angle of about 45° inclined in relation to the longitudinal axis L of the rod-shaped carrier 11, so that nearly all threads are embedded in the carrier 11 and/or the cover 14 and are held in same.

Figure 2:
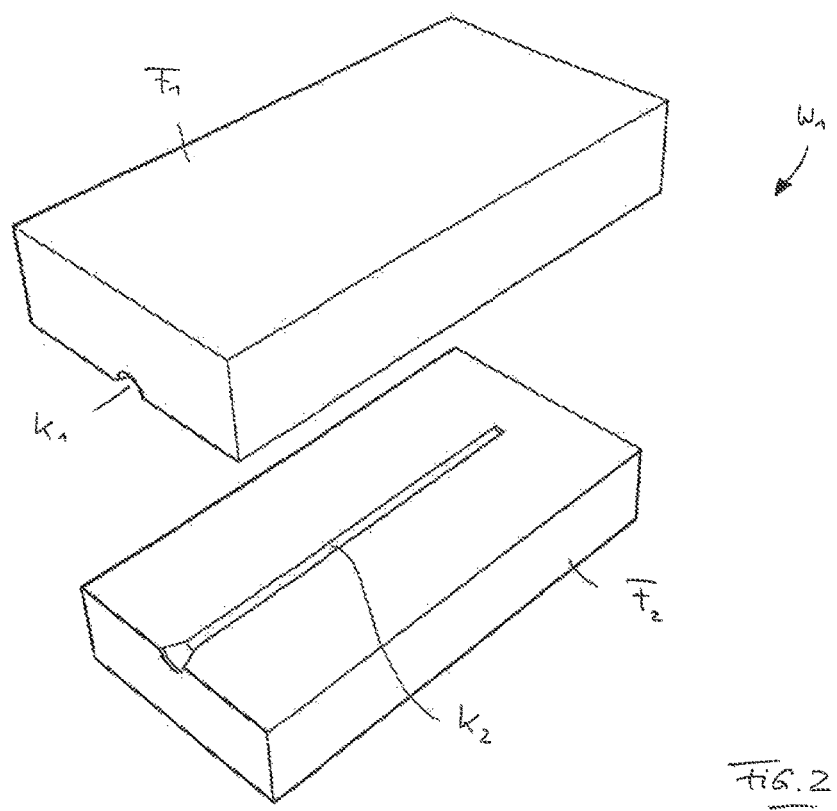
FIG. 2 is a perspective view of opened injection mold.

FIG. 2 shows a schematic perspective view of an opened first injection mold $W_1$ with an upper mold half $F_1$, which has an upper cavity $K_1$, and with a lower mold half $F_2$, which has a lower cavity $K_2$.

Figure 3:
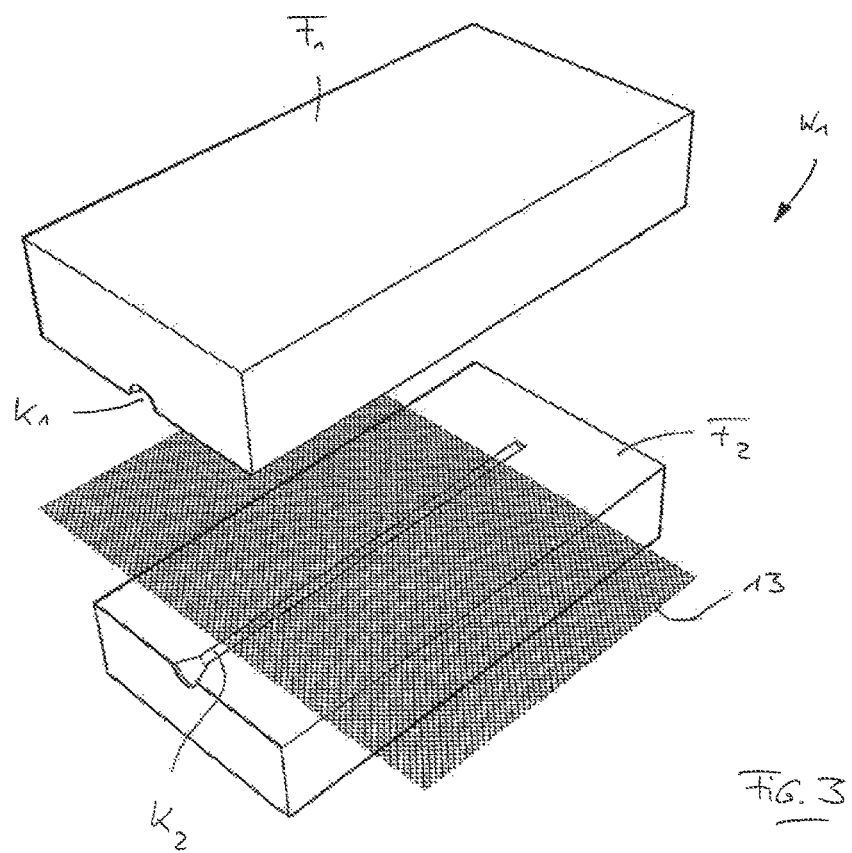
FIG. 3 is the injection mold according to FIG. 2 after insertion of a fabric part.
Figure 4:
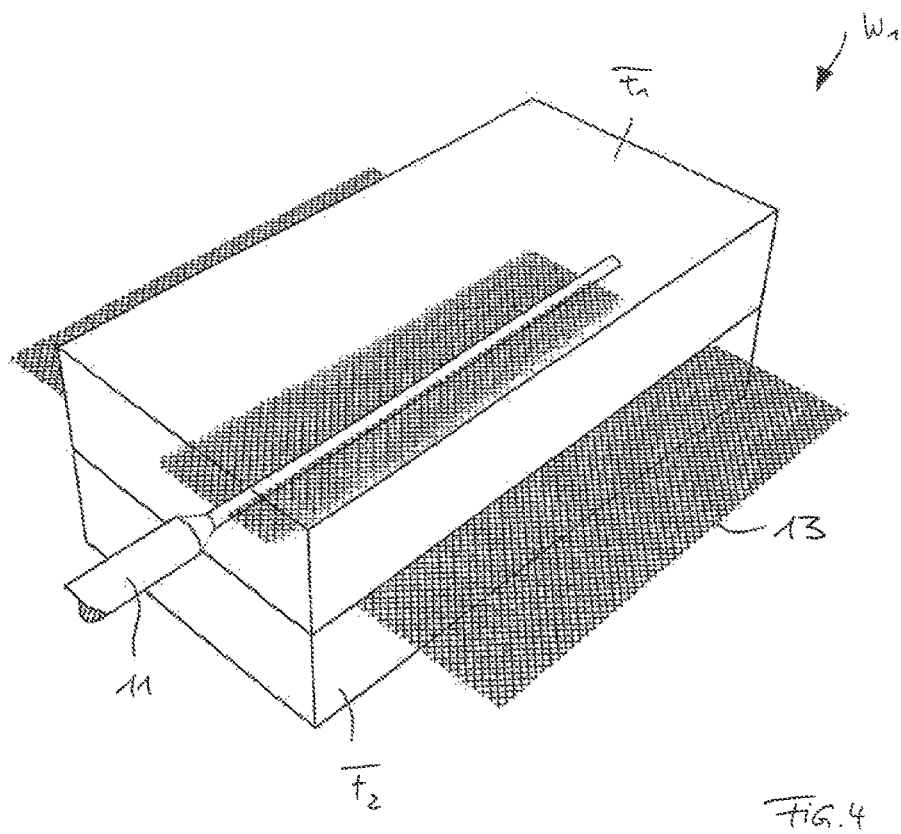
FIG. 4 is the injection mold according to FIG. 3 after closure of the mold.

According to FIG. 3, a fabric part 13 is inserted into the separating plane between the mold halves $F_1$ and $F_2$ or between the cavities $K_1$ and $K_2$, the threads of the thread system forming the fabric part 13 being oriented at an angle of about 45° to the longitudinal axis of the cavities $K_1$, $K_2$ forming the carrier 11. The first injection mold $W_1$ is subsequently closed by the mold halves $F_1$ and $F_2$ being placed on one another. After closing the first injection mold $W_1$, a liquid plastic, which forms the rod-shaped carrier 11, is injected into the mold cavity formed by the cavities $K_1$ and $K_2$, the fabric part 13 passing through the carrier 11 and projecting radially from same, as is shown in FIG. 4. The fabric part 13 preferably lies in the horizontal central longitudinal plane of the rod-shaped carrier 11.

Figure 5:
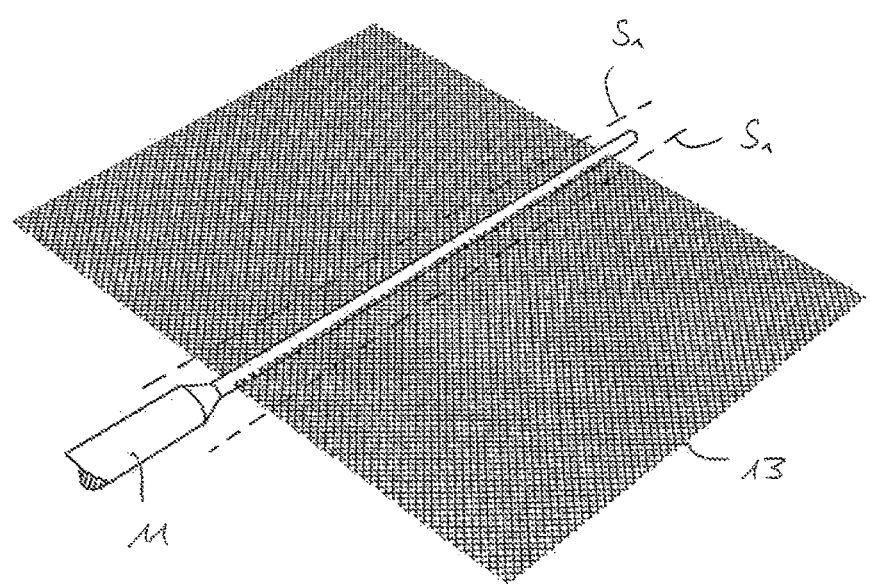
FIG. 5 is an interdental cleaner manufactured in the injection mold before trimming the fabric part.
Figure 6:
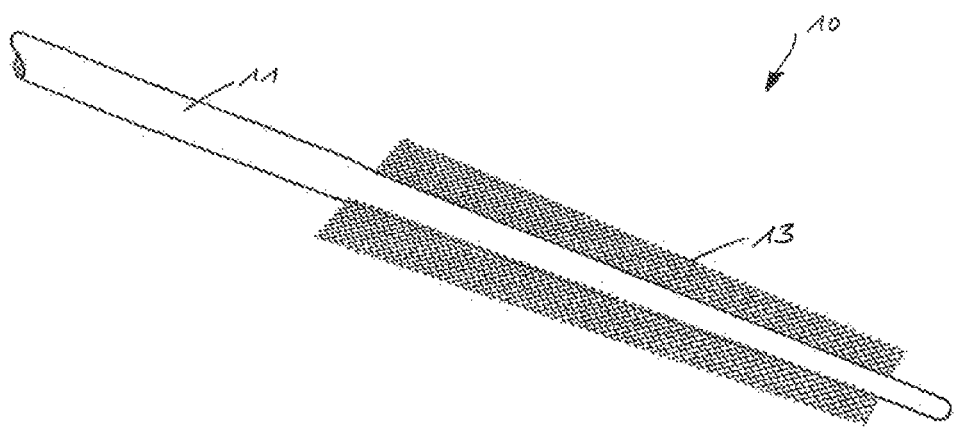
FIG. 6 is the interdental cleaner according to FIG. 5 after trimming the fabric part.

After opening the first injection mold $W_1$, a blank of an interdental cleaner is formed, as is shown in FIG. 5. This comprises the rod-shaped carrier 11 with the embedded fabric part 13, which is, however, still too large for practical application. It is possible to provide the interdental cleaner shown in FIG. 5 with another plastic component or to do without one and finish this interdental cleaner by the radially projecting sections of the fabric part 13 being trimmed along the section lines $S_1$ indicated in FIG. 5 at a distance from the carrier 11 and essentially parallel to same. An interdental cleaner 10 as it is shown in some of its sections in FIG. 6 is then obtained.

Figure 7:
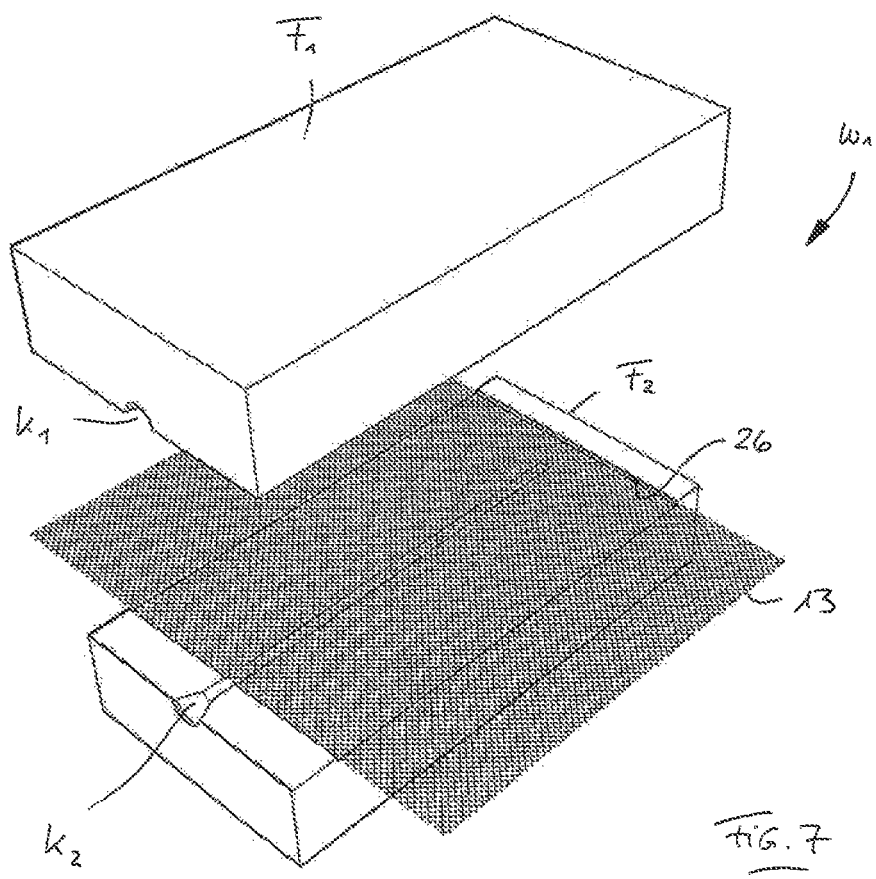
FIG. 7 is an alternative embodiment of the injection mold in the opened state with the fabric part inserted.

FIG. 7 shows a view of a modified injection mold $W_1$, which view corresponds to FIG. 3, identical or similar components being designated by the same reference numbers. The injection mold $W_1$ differs from the injection mold according to FIG. 3 in that a large-surface recess 26 is formed in the lower mold half $F_2$ on the top side of said mold half facing the other mold half, and the fabric part is placed into said recess 26 with a close fit such that it is securely positioned and fixed in the axial direction of the cavity $K_2$. The fabric part is prevented in this manner from being displaced relative to the lower mold half $F_2$ when closing the injection mold $W_1$.

Figure 8:
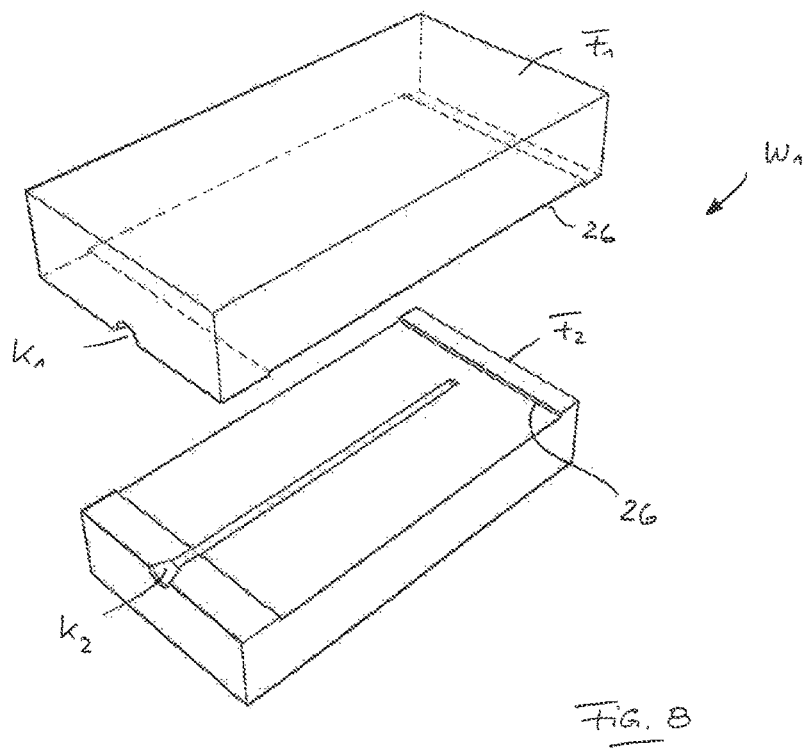
FIG. 8 is another alternative embodiment of the injection mold in the opened state without fabric part.
Figure 9:
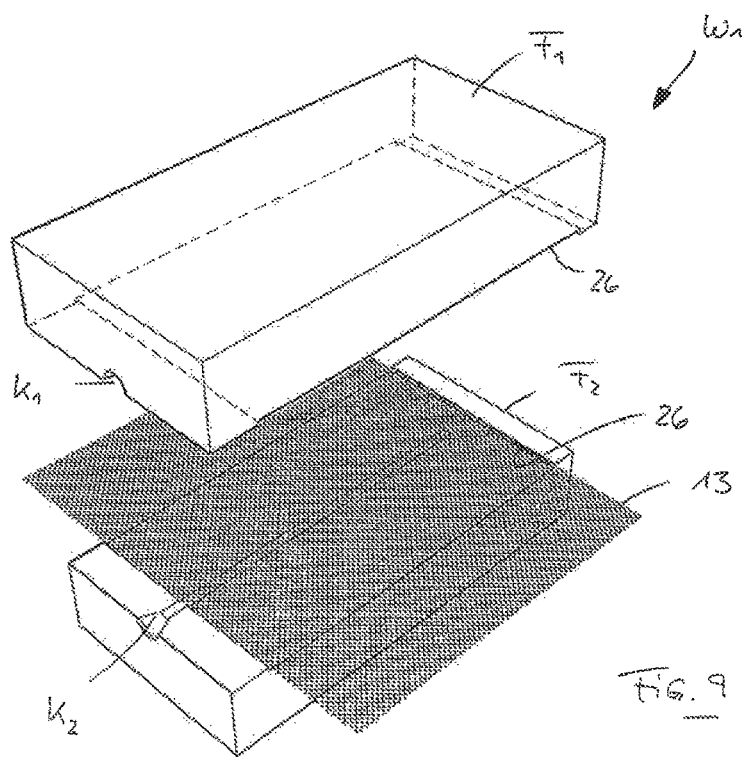
FIG. 9 is the injection mold according to FIG. 8 with the fabric part inserted.

While the recess 26 is formed in the lower mold half $F_2$ only in the embodiment according to FIG. 7, FIGS. 8 and 9 show an embodiment in which a recess 26 each is formed in both mold halves $F_1$ and $F_2$ on surfaces facing each other, the fabric part 13 being arranged and received in both recesses 26 with the injection mold $W_1$ closed.

The recess 26 or the recesses 26 prevent the closing force of the injection mold $W_1$ or of the mold halves $F_1$, $F_2$ from leading to the action of an excessive compressive force on the fabric part 13, as a result of which the latter could be crushed.

Figure 10:
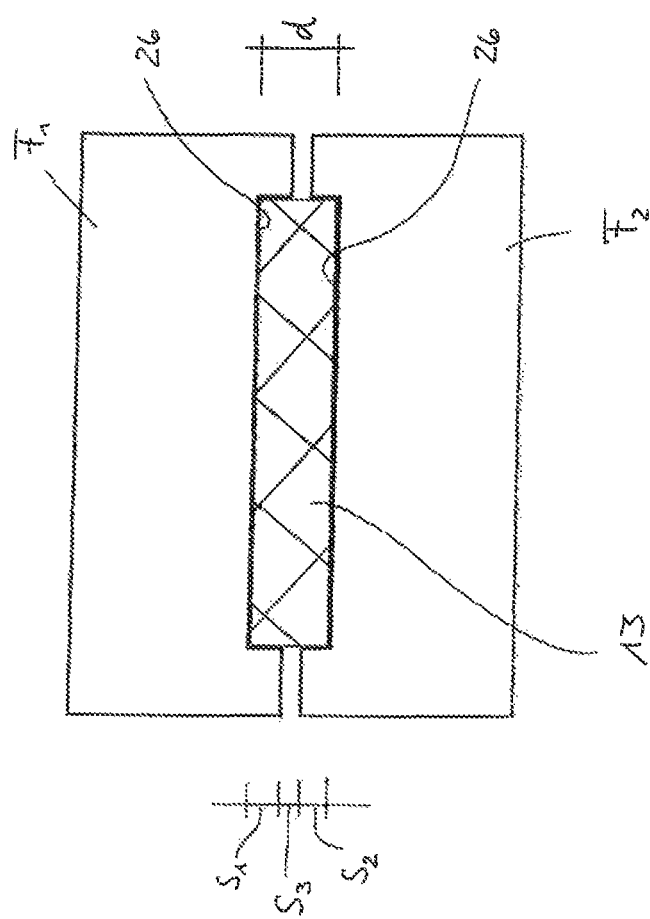
FIG. 10 is a schematic view of the dimensioning of the injection mold according to FIG. 8.

The depth of the recess 26 according to FIG. 7 or the sum of the depths of the recesses 26 according to FIGS. 8 and 9 is selected to be such that it is smaller than the thickness of the fabric part 13, so that the fabric part 13 is clamped between the mold halves $F_1$ and $F_2$ when the injection mold $W_1$ is closed and is held under elastic deformation. FIG. 10 shows in a schematic view a possible dimensioning of the recesses 26 of the injection mold $W_1$. It is assumed here that the fabric part has a thickness d at right angles to the plane in which it extends and that the recesses 26 have a corresponding depth of $s_1$ and $s_2$ in the two mold halves $F_1$ and $F_2$. Provisions are made here for the sum of the depths $s_1$ and $s_2$ of the recesses 26 to be smaller by a value $s_3$ than the thickness d of the fabric part 13. The value for the difference $s_3$ is preferably in the range of 10% to 30% of the thickness d of the fabric part (0.1 $d \leq s_3 \leq 0.3$ d). In particular, the value is between 15% and 25% of the thickness d of the fabric part (0.15 $d \leq s_3 \leq 0.25$ d).

Figure 11:
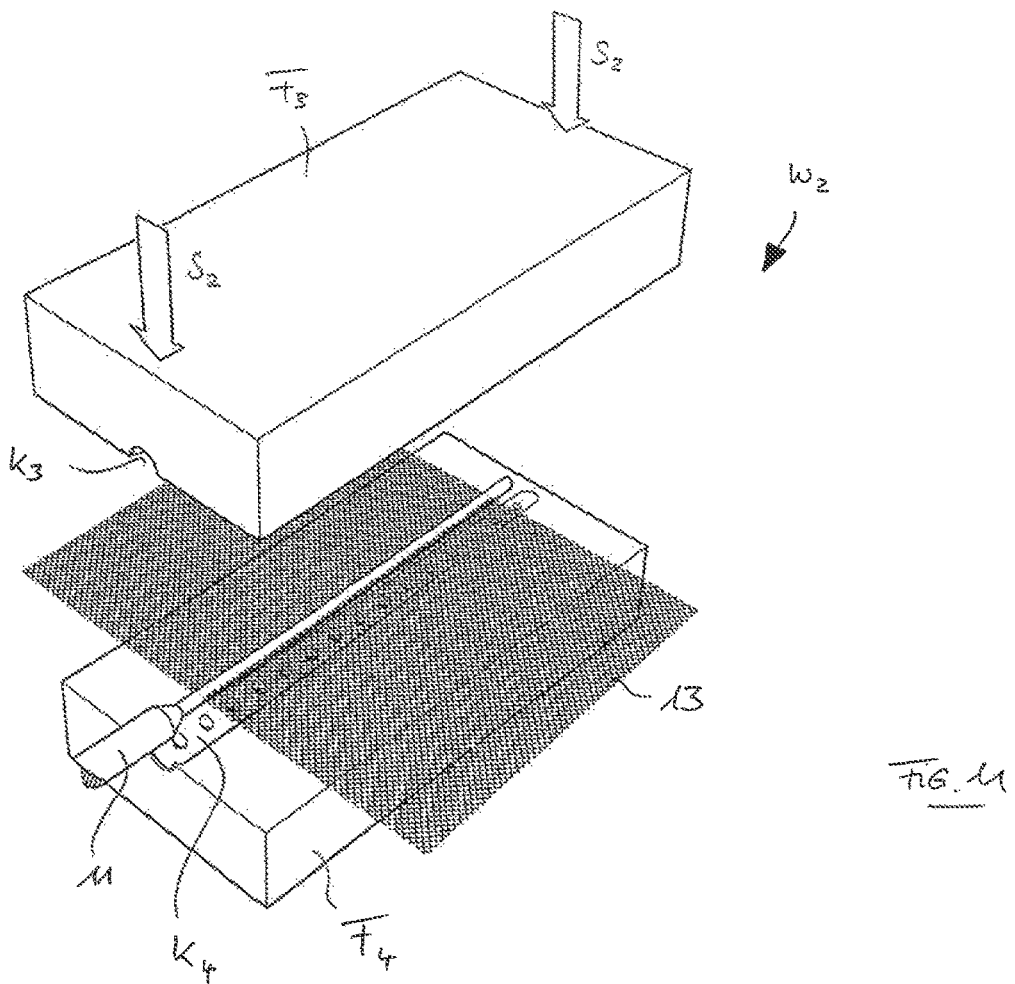
FIG. 11 is the interdental cleaner according to FIG. 5 after insertion into another injection mold.

A second plastic component is preferably molded onto the interdental cleaner 10. A second injection mold $W_2$, which has an upper mold half $F_3$, which has an upper cavity $K_3$, and a lower mold half $F_4$, which has a lower cavity $K_4$, is provided for this purpose according to FIG. 11. According to FIG. 11, the front section of the prefabricated rod-shaped carrier 11 is placed together with the embedded fabric part 13 into the second injection mold $W_3$, the fabric part 13 being arranged in the separating plane between the two mold halves $F_3$ and $F_4$ or between the cavities $K_3$ and $K_4$. The second injection mold $W_2$ is subsequently closed by the upper mold half $F_3$ being lowered onto the lower mold half $F_4$, as is indicated by the arrow $S_2$ in FIG. 11.

Figure 12:
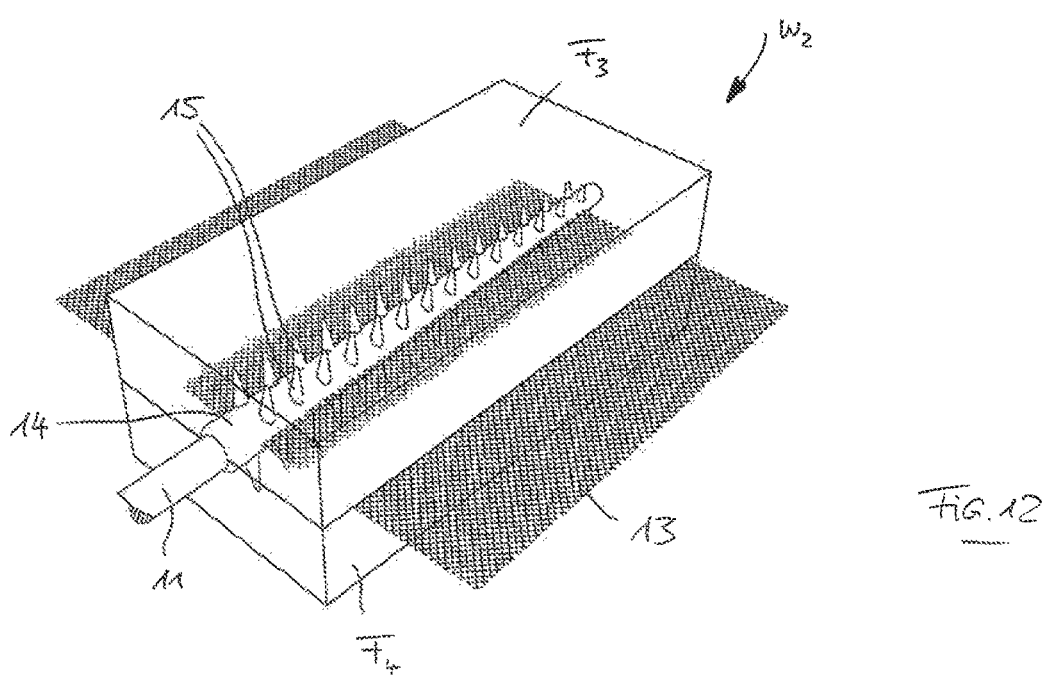
FIG. 12 is the injection mold according to FIG. 11 in the closed state after manufacture of the cover.

After closing the second injection mold $W_2$, as is shown in FIG. 12, a liquid soft elastic plastic, especially a thermoplastic elastomer, is injected into the mold cavity formed by the cavities $K_3$ and $K_4$, so that the section of the carrier 11 located in the second injection mold $W_2$ is provided with the sleeve-like cover 14, which carries the radially outwardly projecting fingers 15 on its outer side. Moreover, it is achieved by means of the injected plastic forming the cover 14 that the fabric part 13 is also embedded in the cover 14 and is held by same.

After opening the second injection mold $W_2$, the radially projecting sections of the fabric part 13 is cut to a desired length, as it is shown in FIG. 13 by section lines $S_3$ indicated as broken lines. The interdental cleaner 10 shown in FIG. 14 is formed in this manner. This has the sleeve-like cover seated on the front end of the rod-shaped carrier 11 with radially projecting fingers 15 formed in one piece and the fabric part 13 projecting radially on opposite sides, the fabric part 13 forming two lateral, flat, wing-like projections extending each in the longitudinal direction of the carrier 11.

As an alternative, the fabric part may also be cut in the closed second injection mold or when opening the second injection mold or with the second injection mold open or even outside the second injection mold in a separate cutting station.

Figure 15:
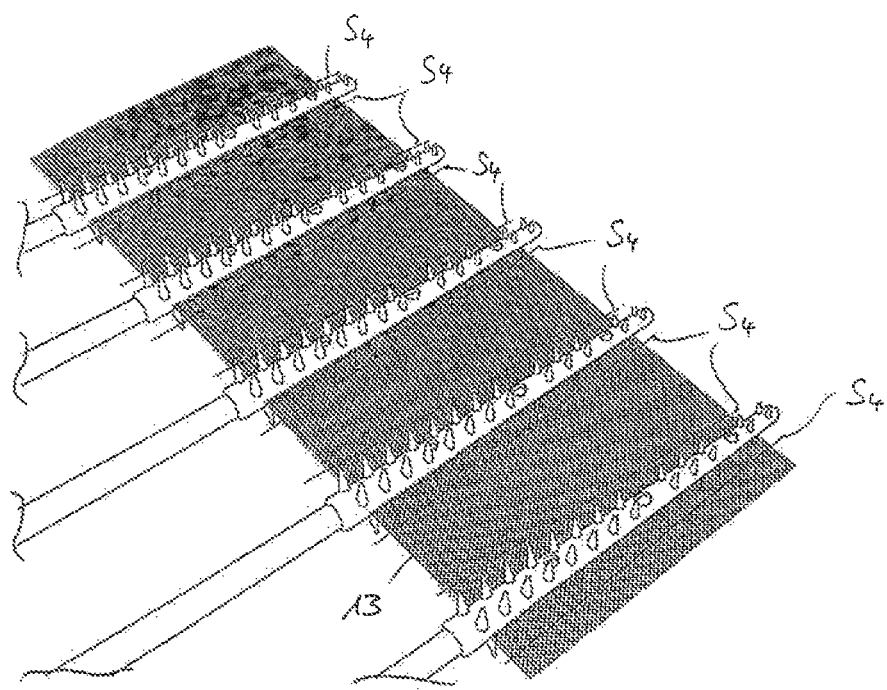
FIG. 15 is the front end of a plurality of interdental cleaners manufactured simultaneously with a common fabric part before trimming.
Figure 16:
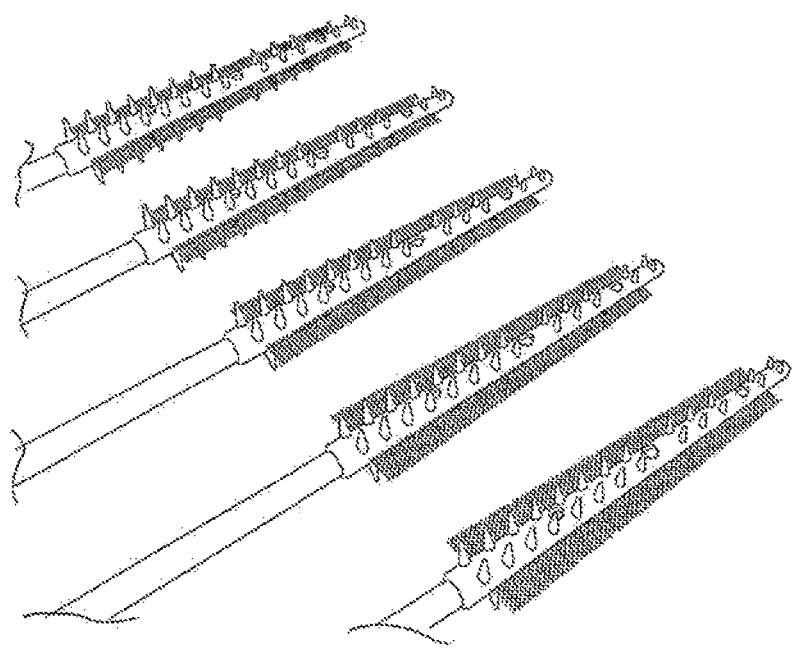
FIG. 16 is the interdental cleaners according to FIG. 15 after trimming.

FIG. 15 shows the possibility of manufacturing a plurality of interdental cleaners having the mentioned configuration simultaneously in a simple manner. The corresponding injection molds are provided for this with a plurality of cavities arranged at a distance next to one another, which are used each to manufacture an interdental cleaner in the above-mentioned manner. A common, strip-shaped fabric part each is placed into all cavities, so that a set of a plurality of (here 5) interdental cleaners are provided after opening the second injection mold, said interdental cleaners being arranged parallel at a distance next to one another and connected to one another via the common, strip-shaped fabric part 14. The fabric parts of the individual interdental cleaners can be cut to a desired size in a next method step along section lines $S_4$, as a result of which the interdental cleaners become detached from one another, as it is shown in FIG. 16 and thus they are not connected to one another at their rear end, not shown.

Figure 17:
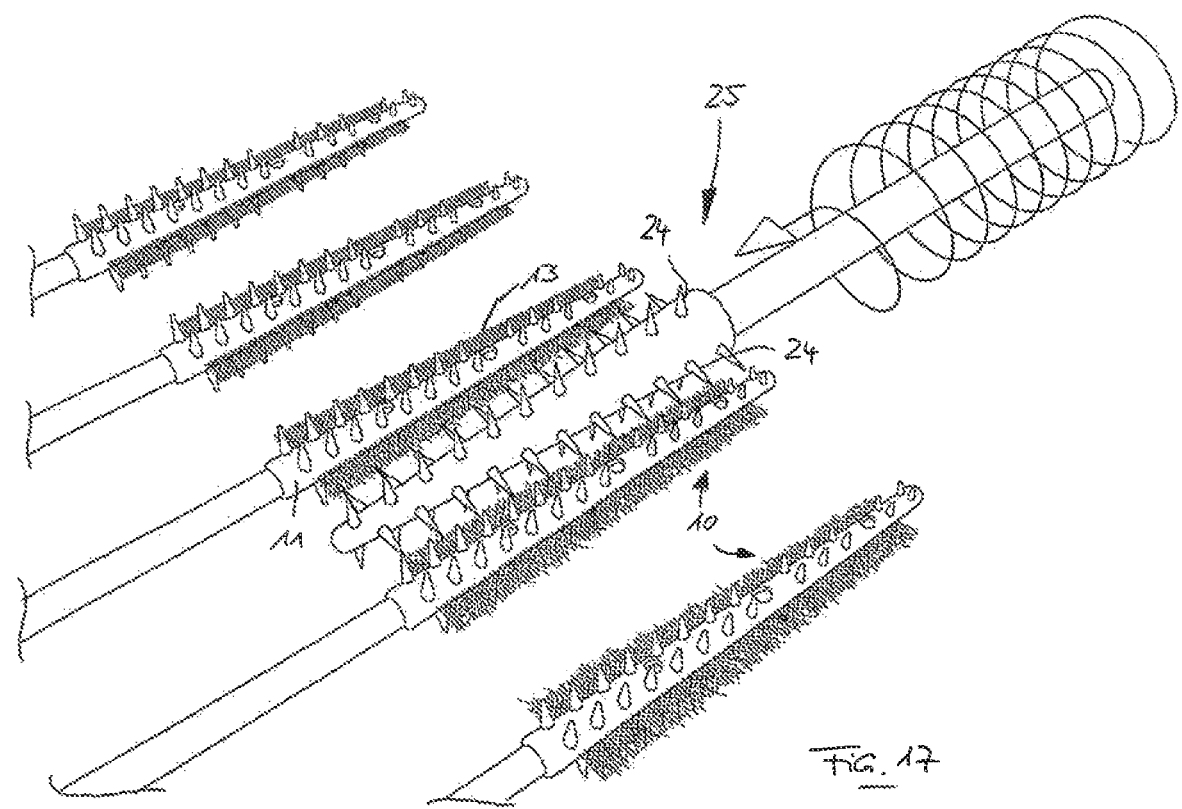
FIG. 17 is the interdental cleaners according to FIG. 16 during splicing.

FIG. 17 shows another possible processing step, by means of which the radially projecting sections of the fabric part 13 are cut or spliced. A rotatingly driven striking tool 25 is provided for this purpose, which has cutting fingers 24, with which the projecting sections of the fabric parts can be beaten and divided into individual threads, which are arranged in random orientations, as it is seen especially in FIG. 17 in the interdental cleaner shown there.

Figure 18:
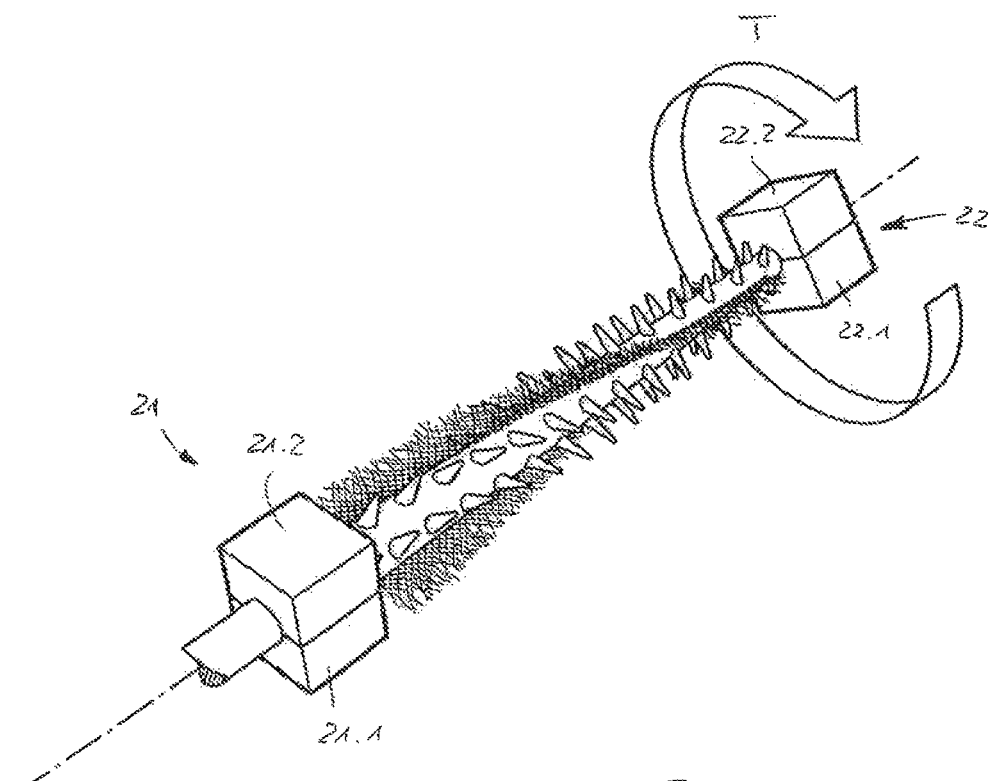
FIG. 18 is the twisting of an interdental cleaner.

FIG. 18 shows another possible processing step of the interdental cleaner, in which this is twisted about its longitudinal axis L, forming a permanent torsional deformation. The interdental cleaner 10 is clamped for this in axially spaced sections into a first holding device 21 and into a second holding device 22. The first holding device 21 has a lower clamping jaw 21.1 and an upper clamping jaw 21.2, which can clamp the interdental cleaner at the rear end of the cover 14, which end faces the grip part. The second holding device 22 has a lower clamping jaw 22.1 and an upper clamping jaw 22.2, which clamp the interdental cleaner at the front end of the cover 14, which end faces away from the grip part. As is shown in FIG. 18, the front, second holding device 22 is rotated about the longitudinal axis L of the interdental cleaner 10 or of the rod-shaped carrier 11, as it is indicated by the arrow T. This causes the area of the interdental cleaner 10 located between the two holding devices 21 and 22, i.e., the section of the carrier 11 located there, the cover 14 with the fingers 15 and the fabric part 13 to be twisted about the longitudinal axis L of the carrier 11, so that they undergo a plastic deformation. After opening and removing the two holding devices 21 and 22, the interdental cleaner 10 is twisted such that the fingers 15 of the cover 14 and especially the radially projecting sections of the fabric part 13 extend helically about the carrier 11.

Even though an interdental cleaner in which the radially projecting sections of the fabric part are spliced is shown in FIG. 18, an interdental cleaner in which the radially projecting sections of the fabric part are not spliced can also be twisted in a similar manner.

Figure 19:
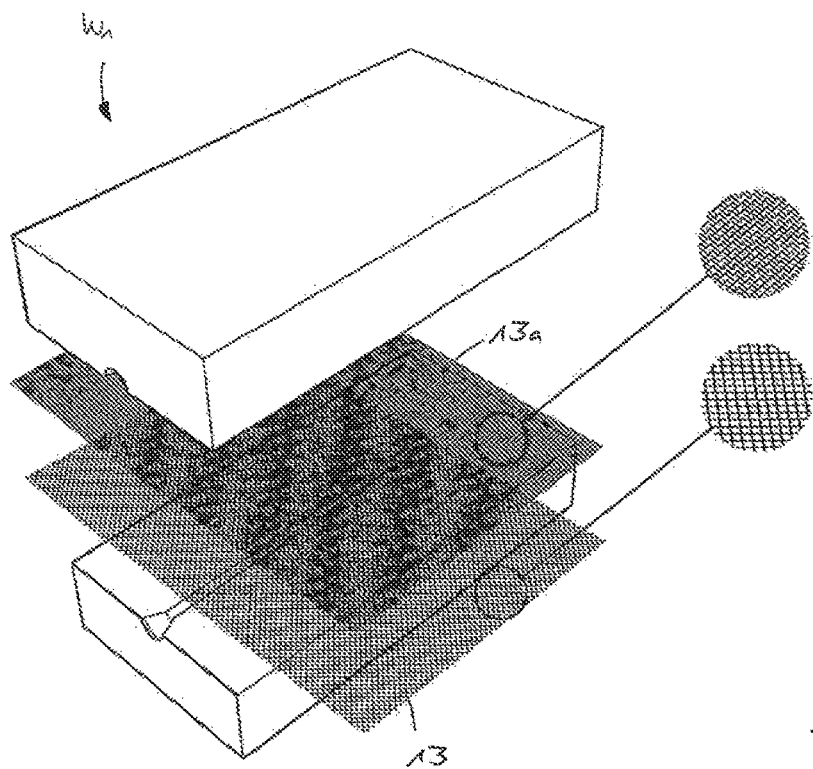
FIG. 19 is a variant of the method with two fabric parts.

FIG. 19 shows a view, corresponding to FIG. 3, of an opened first injection mold $W_1$, in which an additional fabric part 13a is inserted in addition to the fabric part 13 hitherto inserted, the two fabric parts 13, 13a preferably lying directly one on top of another. As is indicated in FIG. 19, the two fabric parts 13 and 13a have different structures, different color orientations and different mesh sizes. By selecting the corresponding fabric parts, the cleaning effect of the interdental cleaner can be adapted to desired requirements.

Figure 20:
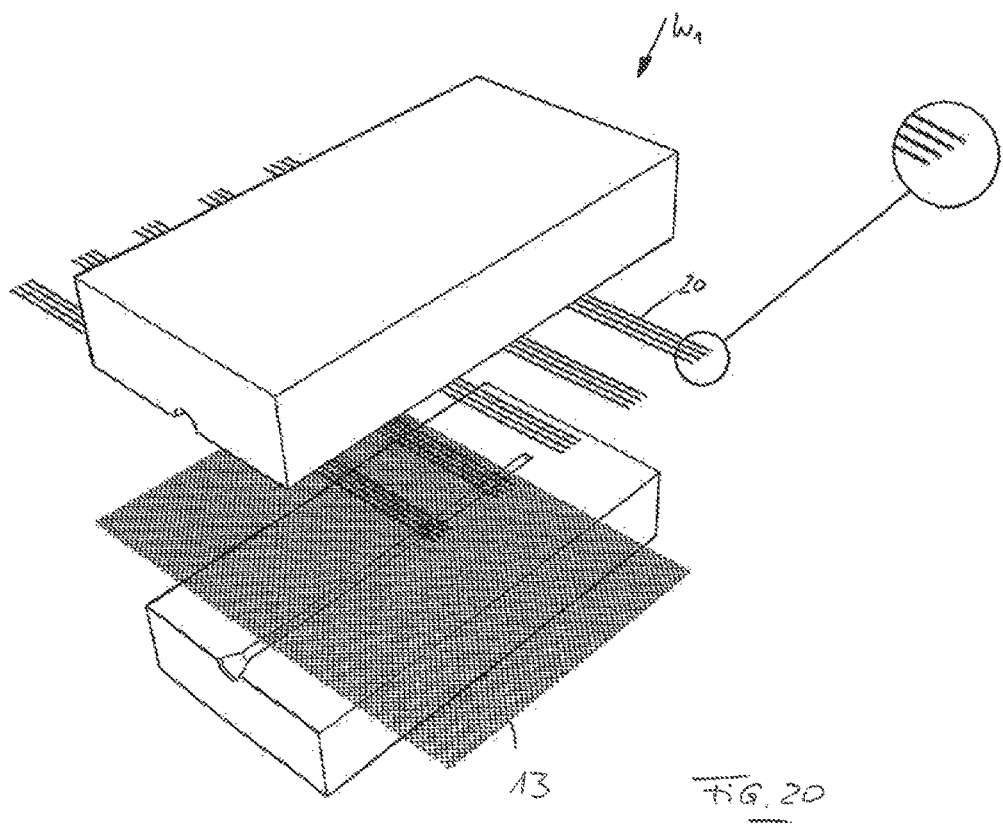
FIG. 20 is another variant of the method with a fabric part and with a bristle border.

FIG. 20 shows another variant of the method according to the present invention, where provisions are made for placing a plurality of individual bristles into the first injection mold $W_1$ in addition to the fabric part 13. The individual bristles 20 are combined into groups of four individual bristles each in the exemplary embodiment shown, the individual bristles 20 being placed on the fabric part 13 or arranged under same and extending at right angles to the longitudinal extension of the cavities $K_1$ and $K_2$ and hence at right angles to the longitudinal axis L of the carrier 11 in the finished interdental cleaner.

FIG. 21 shows a view of a correspondingly manufactured interdental cleaner. This has sections of the fabric part 13, which project radially from the carrier 11 and from the cover 14 and were spliced, but may also be not spliced. In addition, the individual bristles 20 project radially from the carrier 11 and the cover 14, the protruding length of the bristles corresponding approximately to the protruding length of the fabric part 13. The interdental cleaner shown in FIG. 21 may be twisted in a next step about its longitudinal axis in a manner that is not shown to achieve a permanent torsional deformation.

While specific embodiments of the invention have been shown and described in detail to illustrate the application of the principles of the invention, it will be understood that the invention may be embodied otherwise without departing from such principles.

The invention claimed is:

1. An interdental cleaning comprising:
   a carrier rod formed of plastic, the carrier rod having opposing proximal and distal ends and a longitudinal axis which extends through the carrier rod and between the proximal and distal ends thereof;
   a cleaning device disposed over a distal portion of the carrier rod, the cleaning device including a cover and at least one net fabric part;
   the cover is formed from a soft, elastic plastic and covers an exterior surface of the distal portion which includes the distal end of the carrier rod and an outer surface of the cover includes a plurality of projecting elements;
   the at least one net fabric part extends along a longitudinal length of the cover and has mutually intersecting thread systems comprising warp threads and weft threads, wherein the warp threads and the weft threads extend at an angle in the range of 20 to 70 degrees with respect to the longitudinal axis and the at least one net fabric part is embedded in the carrier and the cover part such that the at least one net fabric part passes radially through the carrier and the cover and projects from the carrier and the cover on opposite lateral sides thereof; and
   wherein, during use, the carrier rod and cleaning element are inserted into an interdental space and moved to and fro to clean or remove particles therefrom.

2. An interdental in accordance with claim 1, wherein the warp threads and the weft threads extend at an angle of 45°±10° to the longitudinal axis of the carrier rod.

3. An interdental cleaner in accordance with claim 1, wherein the at least one net fabric part axially projects over carrier rod at the distal portion thereof.

4. An interdental cleaner in accordance with claim 1, wherein the plurality of projecting elements are a plurality of fingers projecting radially from the cover wherein the plurality of fingers consist of the same material as the cover and are monolithic with the cover.

5. An interdental cleaner in accordance with claim 4, wherein the at least one net fabric part projects radially over the plurality of fingers.

6. An interdental cleaner in accordance with claim 1, wherein the at least one net fabric part comprises a plurality of net fabric parts embedded, lying one on top of another, in the carrier rod.

7. An interdental cleaner in accordance with claim 6, wherein the plurality of net fabric parts have different structures and/or different thicknesses and/or different thread orientations and or different mesh sizes.

8. An interdental cleaner in accordance with claim 1, wherein the plurality of projecting elements are a plurality of bristle bundles and/or individual bristles projecting radially from the carrier.

9. An interdental cleaner in accordance with claim 1, wherein sections of the at least one net fabric part radially projecting from the carrier rod are spliced.

10. A method of manufacturing the interdental cleaner of claim 1, the method comprising:
    extrusion coating the at least one net fabric part with plastic in a first injection mold;
    forming the carrier rod by injection molding, such that the at least one net fabric part passes through the carrier rod and projects radially therefrom; and
    placing the carrier rod and the at least one net fabric part into a second injection mold and injection molding the soft, elastic plastic into the second injection mold to form the cover and the plurality of projecting elements thereof, over the distal portion of the carrier rod and the at least one net fabric part, such that the at least one net fabric is embedded in the cover.

11. A method in accordance with claim 10, wherein the warp threads and the weft threads are arranged at an angle of 45°±10° to the longitudinal axis of the carrier rod.

12. A method in accordance with claim 10, wherein the at least one net fabric part is arranged in a recess formed in at least one mold half of the first injection mold.

13. A method in accordance with claim 12, wherein the at least one net fabric part is arranged with close fit in the recess.

14. A method in accordance with claim 12, wherein the at least one net fabric part is held in the recess under elastic deformation when the first injection mold is closed.

15. A method in accordance with claim 12, wherein the recess is formed in each of the mold halves on surfaces facing each other and the at least one net fabric part is arranged in both of the recesses.

16. A method in accordance with claim 12 wherein a depth of the recess or a sum of a depth of both of the recesses corresponds to 70% to 90% of a thickness of the at least one net fabric part.

17. A method in accordance with claim 10, wherein the plurality of projecting elements are a plurality of bristle bundles and/or individual bristles projecting radially from the carrier.

18. A method in accordance with claim 10, wherein the carrier rod is twisted about the longitudinal axis in at least one part of the distal portion of the carrier rod having the at least one net fabric part about the longitudinal axis.

19. A method in accordance with claim 10, wherein sections of the at least one net fabric part radially projecting from the carrier rod are spliced.

* * * * *